United States Patent
Suttle et al.

(10) Patent No.: US 9,665,475 B2
(45) Date of Patent: *May 30, 2017

(54) APPLICATION EXPERIMENT SYSTEM

(71) Applicant: Amazon Technologies, Inc., Reno, NV (US)

(72) Inventors: Ian C. Suttle, Tustin, CA (US); Steven J. Lee, Rancho Santa Margarita, CA (US); Marcus A. King, Aliso Viejo, CA (US); Timothy J. Berger, San Bernardino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/322,731

(22) Filed: Jul. 2, 2014

(65) Prior Publication Data
US 2015/0007135 A1 Jan. 1, 2015

Related U.S. Application Data

(63) Continuation of application No. 13/491,410, filed on Jun. 7, 2012, now Pat. No. 8,776,021.

(51) Int. Cl.
G06F 11/36 (2006.01)
H04L 29/08 (2006.01)

(52) U.S. Cl.
CPC ...... G06F 11/3688 (2013.01); G06F 11/3684 (2013.01); H04L 67/10 (2013.01); H04L 67/34 (2013.01)

(58) Field of Classification Search
CPC .. G06F 11/3684; G06F 11/3688; H04L 67/34; H04L 67/10
USPC .......................................................... 717/121
See application file for complete search history.

(56) References Cited

U.S. PATENT DOCUMENTS

| 7,127,705 | B2 | 10/2006 | Christfort et al. |
| 7,299,382 | B2 | 11/2007 | Jorapur |
| 8,776,021 | B1 * | 7/2014 | Suttle ............. G06F 11/3684 717/121 |
| 2003/0204784 | A1 * | 10/2003 | Jorapur ............ G06F 11/3684 714/38.14 |
| 2007/0234293 | A1 | 10/2007 | Noller et al. |
| 2009/0279673 | A1 * | 11/2009 | Maffre ............ H04L 12/2697 379/1.03 |
| 2009/0307763 | A1 | 12/2009 | Rawlins et al. |
| 2011/0296384 | A1 | 12/2011 | Pasternak |

(Continued)

Primary Examiner — John Chavis
(74) Attorney, Agent, or Firm — Knobbe, Martens, Olson & Bear, LLP

(57) ABSTRACT

Examples of an application experiment system are provided that can manage and run experiments for software applications. In one embodiment, the application experiment system receives definitions for experiments and treatments for an application, runs experiments in response to requests from users of the system, automatically allocates treatments to users of the application, logs experiment data and treatment allocation data, and/or reports experiment results data. The application experiment system enables application developers to test changes or features in a precise, controlled environment on a limited user base before deciding whether to deploy changes or features to all users of an application.

17 Claims, 12 Drawing Sheets

(56) References Cited

U.S. PATENT DOCUMENTS

| | | | | |
|---|---|---|---|---|
| 2012/0042210 A1* | 2/2012 | Glaser | ................ | G06F 11/3684 |
| | | | | 714/38.1 |
| 2012/0324427 A1* | 12/2012 | Provost | ............... | G06F 11/3688 |
| | | | | 717/126 |
| 2014/0298337 A1* | 10/2014 | Anderson | ............. | G06F 9/5077 |
| | | | | 718/1 |
| 2015/0363304 A1* | 12/2015 | Nagamalla | .......... | G06F 11/3688 |
| | | | | 702/123 |
| 2016/0117357 A1* | 4/2016 | Colrain | ............. | G06F 17/30557 |
| | | | | 707/703 |

* cited by examiner

APPLICATION EXPERIMENT SYSTEM

CROSS REFERENCE TO RELATED APPLICATIONS

This application is a continuation of U.S. application Ser. No. 13/491,410, filed Jun. 7, 2012, which is incorporated by reference herein in its entirety.

BACKGROUND

Software application developers frequently make updates to software applications to incorporate new features or changes. Often it is desirable to test these updates with a portion of application users before deploying the updates to all application users. Developers use various approaches to test particular implemented features or changes in controlled distribution settings. Software applications become more complex as the functionality increases, making reliable testing and evaluation of changes and new features challenging and time-consuming.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
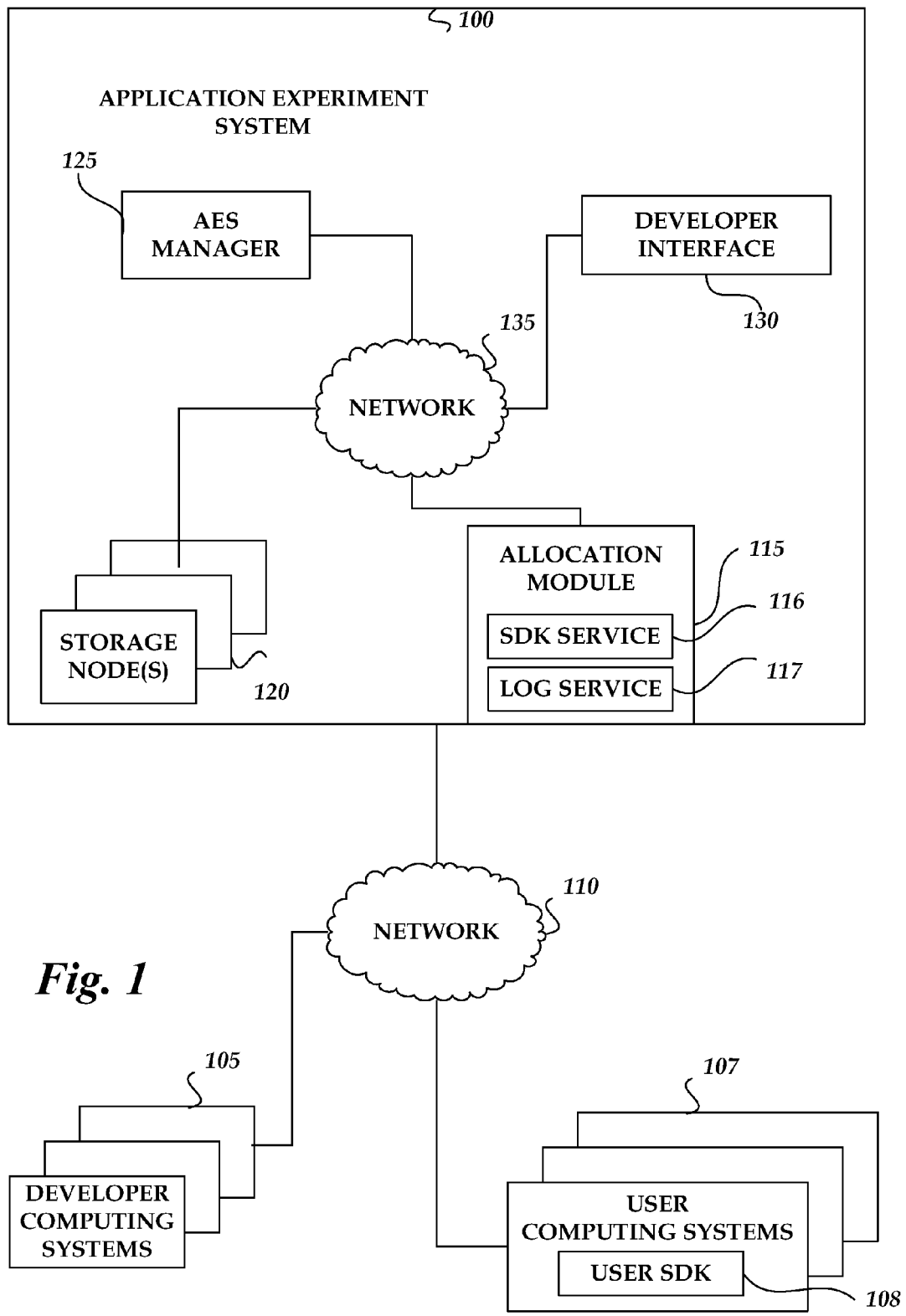
FIG. 1 is a network diagram schematically illustrating an example of an application experiment system.

During the lifespan of a software application, the software application's source code may need to be updated to account for changes or to update or provide new features to the users of the software application. Changes may be external (e.g., location changes of services, interface changes of other software systems, or the like) and/or internal (e.g., new software package versions). Often the impact of these changes, updates to features, or new features is unknown until the modified source code is deployed to the user, and the user interacts with the updated software application.

Developers may benefit from a system that allows the developer to test these modifications in a controlled experiment. Such a system can allow developers to conduct software A/B testing in order to compare and evaluate test samples relative to a control sample. For example, in an experiment, certain changes to the application could be deployed to only a percentage of users, and for a limited duration. During the experiment, the system may collect statistical data about the experiment and certain effects the modifications may have for the user. The statistical data can then be analyzed and reported to the developers, who can then determine whether the modified source code should be deployed to all users of the application, or whether further changes are necessary. The developers can optionally conduct another experiment and re-assess the results as many times as desired.

There are other potential benefits to such a system. For example, developers may want to deploy changes or features to a software application quickly, but be able to remove the changes or features if there are issues or problems with the changes. In some implementations, developers may want to control the rate at which a new change or feature is deployed in order to test and assess possible system and software interactions that cannot be tested in a development environment. Further, developers may wish to determine if the user response to a change is negative before deploying the change to all users.

Such a system may be of benefit, for example, to developers of software games and applications. Game developers may want to test a particular feature or change with a limited number of users in a live environment and gather feedback and statistics related to the impact of the change on the users' experience. The efficacy of the results may be enhanced by comparison of a control group that does not experience the feature or change to a test or experiment group that does experience the feature or change. Game developers may find the experiment results useful to determine, for example, whether a particular feature or change increased the difficulty of the game and how it impacted the user experience, before implementing the change or feature for all users.

Embodiments of an application experiment system ("AES") are described below. In one embodiment, an application experiment system is a system that enables developers to define and run experiments for software applications. The application experiment system provides application program interfaces (APIs) and/or user interfaces for developers to define and run experiments and request experiment results.

In certain implementations described herein, an experiment generally refers to a test that may be run on the application. An experiment may also be referred to herein as an experiment definition or an experiment configuration. In one embodiment, a developer may setup or define an experiment via a developer interface or web-based portal. The developer begins by selecting an application on which to perform an experiment. Once selected, the developer then defines a test area within the application for the experiment, or selects a test area that has already been defined. A test area may, for example, correspond to a particular level or sub-level of a game. The developer may also define an expiration date or duration for the experiment to end the experiment after a certain period of time. The experiment may also include information such as an experiment name and a description.

In certain implementations described herein, experiments may further include one or more treatments. A treatment can describe the potential differences in experiences for the user. In one embodiment, a control treatment may provide the user with the default application settings, with no changes or features enabled. One or more test treatments may also provide the user with different application settings provided by the developer, with changes or features enabled. Each treatment may further provide one or more factors, which represent the application settings to be tested. In one embodiment, the developer can also assign to each of the treatments a distribution value or percentage to indicate what percentage of users should experience the respective treatment. For example, a developer may specify two treatments, one of which may be the control treatment and one of which may be the test treatment, and further specify that thirty percent of users should receive the control treatment and seventy percent of users should receive the test treatment. In some embodiments, the developer may change or update this distribution value, either before or during a running experiment, and the application experiment system can dynamically change the percentage of users experiencing each treatment accordingly.

Another possible benefit of the application experiment system may be the relatively minimal changes to the application source code that the developer makes in order for the experiment to be run by the system. In one example implementation, once the developer has set up the test area, experiment, treatments, and factors, the developer need only add a few lines of source code to the application, in accordance with a Software Developer Kit (SDK) provided by the application experiment system. An executable version of the modified source code may then be deployed to users, and users who are later allocated to a test treatment may experience the provided changes or features when they execute (or request execution) of the executable version. The use of an SDK is optional. In other example implementations, a web service can be called to handle treatment allocations and logging, without the use of an SDK.

In one embodiment, once an experiment has been set up by a developer, the application experiment system can run the experiment at the developer's request. When an experiment is running, users of the application are dynamically assigned to one of the treatments provided by the developer. Once a user has experienced a treatment, the application experiment system logs experiment data related to the user's experience. In some embodiments, the application experiment system may end the experiment after the experiment duration has been reached, or in response to a request by the developer to stop or abort the experiment early. Once the experiment has ended all users receive the default or control treatment.

In certain implementations described herein, experiment results data may be provided to developers. Developers can use the experiment results data, for example, to determine whether certain tested changes or features should be deployed to all users, or whether to run further experiments. Experiment results data may include, for example, data related to the number of times a treatment was experienced by a user or users, data related to the number of times the software application was accessed, data measuring various metrics associated with the experiment, statistical data generated by the application experiment system, and other data related to the experiment.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential to each embodiment.

Examples of Application Experiment Systems

FIG. 1 is a network diagram schematically illustrating an example of an application experiment system ("AES") 100 that manages software application experiments submitted by developers or other entities. The application experiment system 100 can manage application experiments for developers with services and modules configured to receive and store experiment definitions, run experiments and allocate treatments to users, and report experiment results.

In the illustrated embodiment of FIG. 1, the application experiment system 100 communicates with developer computing systems 105 and/or user computing systems 107 using a network 110, for example, to receive experiment and treatment definitions from the developer computing systems 105 or to allocate treatments for experiments to user computing systems 107. In one embodiment, the developer and user computing systems are the same system. For example, the developer may also be a user of the application.

The application experiment system 100 can include any system capable of receiving experiment definitions and treatment definitions, storing those definitions, running the experiment, allocating treatments to user computing systems 107, recording allocated treatments, and/or generating and returning experiment result data. In FIG. 1, the application experiment system 100 includes a developer interface 130, which can include one or more servers (e.g., a web server) configured to receive and respond to requests from the developer systems 105. The application experiment system 100 can also include an allocation module 115 configured to receive and respond to requests from the user computing systems 107.

The application experiment system 100 can also include storage nodes 120 for storing experiment definitions, treatment definitions, factor definitions associated with the treatments, treatment distributions, treatment allocations, experiment and/or allocated treatment log data, statistical data related to the log data, source code data, and related data. In one embodiment, the storage nodes 120 include a treatment log, which stores log entries generated by the allocation module 115's log service 117. The storage nodes 120 may comprise any type of persistent data storage, for example non-volatile memory devices such as, e.g., hard disk drives, optical disk drives, etc.

The application experiment system 100 can include an AES manager 125. An AES manager 125 may monitor, track and/or manage the processes of the application experiment system 100. The AES manager 125 can be in communication with other components of the application experiment system 100 via a network 135. In the example illustrated in FIG. 1, the AES manager 125 can access allocation module 115, storage nodes 120, and developer interface 130 via the network 135. The network 135 may include multiple networking devices (not shown) such as, e.g., switches, edge routers, core routers, etc. The network 135 may, but need not be, a different network than the network 110 shown in FIG. 1.

The AES manager 125 can receive and process requests to create and/or edit experiment and treatment definitions from the developer computing systems 105, for example via the developer interface 130. The AES manager 125 can process and store these definitions, for example at storage nodes 120.

The AES manager 125 can also receive and process requests to start, stop, and/or abort an experiment. The AES manager 125 can also receive and process requests to retrieve and/or report experiment results data associated with an experiment.

Developers, using their computing systems 105, can develop applications and deploy source code packages for those applications via a user SDK 108 to the user computing systems 107. The deployed source code packages and/or user SDK 108 may, for example, include code configured to access the application experiment system 100, retrieve experiment and treatment definitions, and request and/or record treatment allocations. Developers, using their computing systems 105, can also submit experiment and treatment definitions to the application experiment system 100. The developer computing systems 105 can include wireless mobile devices (such as smart phones, PDAs, tablets or the like), desktops and laptops, to name a few. The application experiment system 100 can then apply updates to the source code packages and run the experiments.

In one embodiment, the application experiment system 100 can include an allocation module 115. The allocation module 115 can include an SDK service 116 configured to receive requests to allocate treatments and/or receive requests to record allocated treatments from the user computing systems 107 via the user SDK 108. The SDK service 116 may access storage nodes 120 to retrieve experiment and treatment definitions. The SDK service 116 can then allocate a treatment and return the treatment allocation to the requesting user computer system 107.

In one embodiment, the allocation module 115 can also include a log service 117. The SDK service 116 may also process a request to record an allocated treatment from the user computing systems 107. The SDK service 116 may access storage nodes 120 to retrieve experiment and treatment definitions and verify the treatment allocation. The SDK service can then submit a request to log the allocation to the log service 117. The log service 117 may record the log entry locally or at the storage nodes 120.

In some embodiments, the application experiment system 100 and its components are executed or embodied by one or more physical or virtual computing systems. For example, in some embodiments, a server computing system that has components including a central processing unit (CPU), input/output (I/O) components, storage, and memory may be used to execute some or all of the components of the application experiment system 100 such as, e.g., the allocation module 115. The I/O components can include a display, a network connection to the network 135, a computer-readable media drive, and other I/O devices (e.g., a keyboard, a mouse, speakers, etc.). An embodiment of the application experiment system 100 can be stored as one or more executable program modules in the memory of the server, and the application experiment system 100 can interact with computing nodes (e.g., physical computing systems and/or virtual machine instances) over the network 135. In one embodiment, the application experiment system 100 may have additional components or fewer components than described above. For example, the application experiment system 100 may be built on top of existing software development or testing systems and designed to coordinate the actions of the existing systems.

Figure 2:
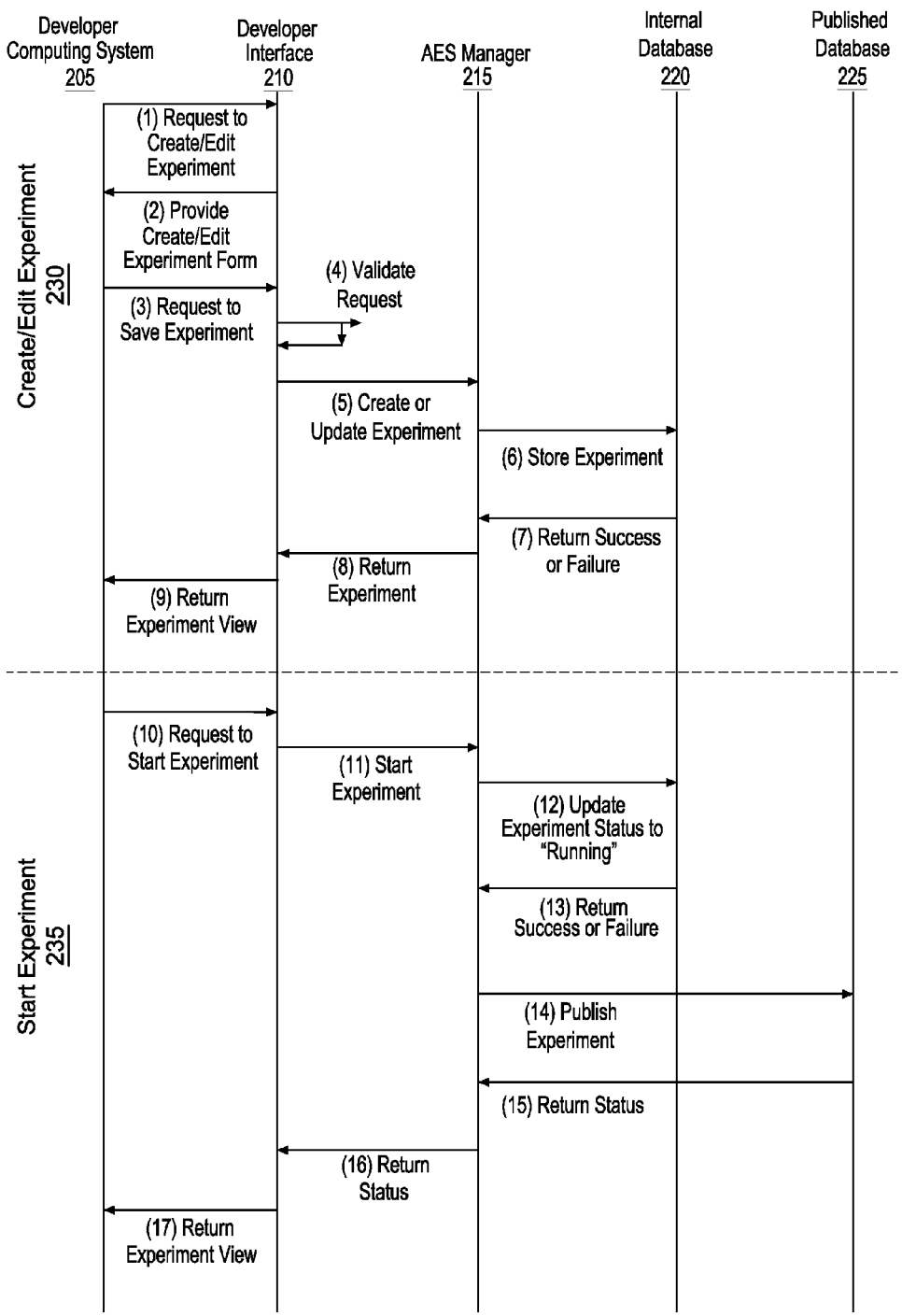
FIG. 2 schematically illustrates a logical flow diagram for an example experiment creation scenario involving the application experiment system of FIG. 1.

FIG. 2 schematically illustrates a logical flow diagram for an example create experiment scenario. In some implementations, services are provided by embodiments of the application experiment system 100 described with reference to FIG. 1 or by one of its components, such as the allocation module 115, AES manager 125 or developer interface 130. The example scenario is intended to illustrate, but not to limit, various aspects of the application experiment system 100. As illustrated in FIG. 2 and further described below, the following events occur during the example scenario:

The first stage of the scenario is the create/edit experiment 230 stage. At event 1, a developer interface 210, such as the developer interface 130 of FIG. 1, receives a request to create or edit an experiment from a developer computing system 205, such as one of the developer computing systems 105 of FIG. 1. At event 2, the developer interface 210 provides a form to create or edit an experiment to the developer computing system 205. At event 3, the developer computing system 205 submits a request to save the experiment to the developer interface 210. The experiment may, for example, include data such as an application identifier, a test area identifier, an experiment name, a description, and an expiration date. At event 4, the developer interface 210 may then validate the request, for example to verify that the experiment is a valid experiment for the identified application and test area. At event 5, the developer interface 210 submits a request to create or update the experiment to an AES manager 215, such as the AES manager 125 of FIG. 1. The AES manager 215 processes the request and, at event 6, submits a request to store the experiment to an internal database 220, such as one or more of the storage node(s) 120 of FIG. 1. At event 7, the internal database 220 returns a status indicator of the request to store the experiment, for example success of failure, to the AES manager 215. At event 8, the AES manager 215 returns the experiment to the developer interface 210. The AES manager 215 may also return the status indicator to the developer interface 210. At event 9, the developer interface 210 returns an experiment view to the developer computing system 205. The experiment view may include, for example, the status indicator and different views of the experiment depending on the status indicator.

The second stage of the scenario shown in FIG. 2 is the start experiment 235 stage. At event 10, the developer interface 210 receives a request to start an experiment from the developer computing system 205. At event 11, the developer interface 210 submits a request to start the experiment to the AES manager 215. The AES manager 215 processes the request and, at event 12, submits a request to update the experiment status to "running" to the internal database 220. At event 13, the internal database 220 returns a first status indicator of the request to update the experiment status, for example success of failure, to the AES manager 215.

In one embodiment, at event 14, the AES manager 215 may submit a request to publish the experiment to a published database 225, such as one or more of the storage node(s) 120 of FIG. 1. At event 15, the published database 225 returns a second status indicator of the request to publish the experiment, for example success or failure, to the AES manager 215.

At event 16, the AES manager 215 returns the first status indicator to the developer interface 210. At event 17, the developer interface 210 returns an experiment view to the developer computing system 205. The experiment view may include, for example, the first status indicator and different views of the experiment depending on the first status indicator.

In one embodiment, the events of the create/edit experiment 230 stage may be repeated before moving on to the events of the start experiment 235 stage. In another embodiment, the events of the start experiment 235 stage may not occur at all, for example, if the developer interface 210 never receives a request to start an experiment from the developer computing system 205.

Figure 3:
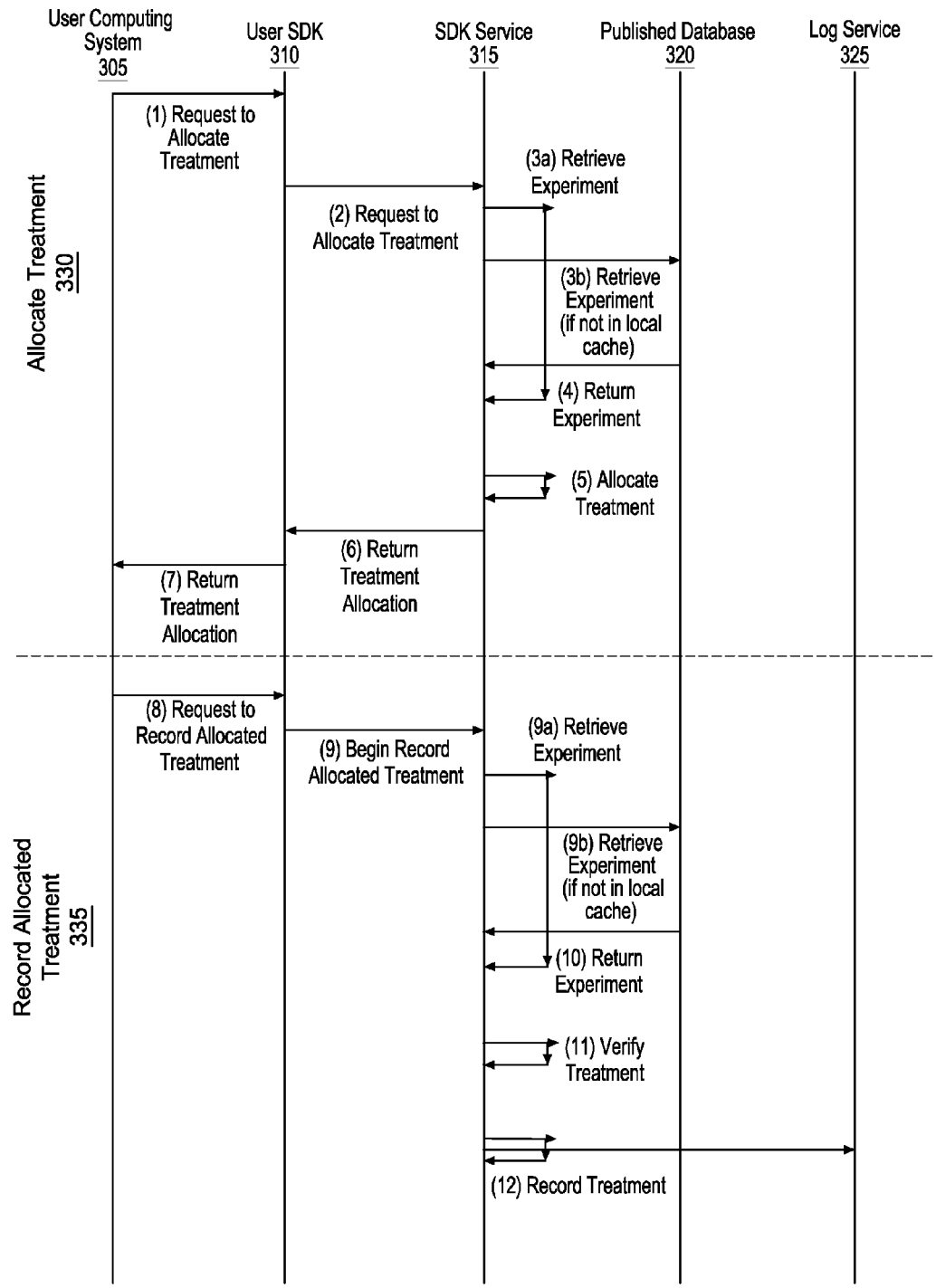
FIG. 3 schematically illustrates a logical flow diagram for an example treatment allocation scenario involving the application experiment system of FIG. 1.

FIG. 3 schematically illustrates a logical flow diagram for an example treatment allocation scenario. In some implementations, services are provided by embodiments of the application experiment system 100 described with reference to FIG. 1 or by one of its components, such as the SDK service 116, log service 116, or storage node(s) 120. The example scenario is intended to illustrate, but not to limit, various aspects of the application experiment system 100. As illustrated in FIG. 3 and further described below, the following events occur during the example scenario:

The first stage of the scenario is the allocate treatment 330 stage. At event 1, a user SDK 310, such as the user SDK 108 of FIG. 1, receives a request to allocate a treatment for a test area from a user computing system 305, such as one of the user computing systems 107 of FIG. 1. The request to allocate a treatment may include data used to locate and retrieve an experiment, for example an application identifier, a platform identifier, a test area identifier, and a unique identifier for the request. At event 2, the SDK service 315, such as the SDK service 116 of FIG. 1, receives the request to allocate a treatment from the user SDK 310. At event 3a, the SDK service 315 retrieves an experiment configuration for the experiment from a local cache, such as one or more of the storage nodes 120 of FIG. 1. The experiment may be located and retrieved using the application identifier, the platform identifier, and the test area identifier. Alternatively, at event 3b, if the experiment configuration is not in the local cache, the SDK service 315 may retrieve the experiment configuration from a published database 320, such as one or more of the storage node(s) 120 of FIG. 1. At event 4, the experiment configuration is returned to the SDK service 315, either from the local cache or from the published database 320. At event 5, the SDK service uses the experiment configuration's distribution settings to determine which treatment to allocate to the user computing system 305. The treatment allocation may include, for example, a treatment group name. At event 6, the SDK service 315 returns the treatment allocation to the user SDK 310. At event 7, the user SDK 310 provides the treatment allocation to the user computing system 305.

The second stage of the scenario shown in FIG. 3 is the record allocated treatment 335 stage. At event 8, the user SDK 310 receives a request to record an allocatedtreatment for an experiment from the user computing system 305. The request to record an allocated treatment may include data used to identify the allocated treatment, for example the application identifier, the platform identifier, the test area identifier, a unique identifier for the request, and the treatment group name determined at event 5 during the first stage. At event 9, the SDK service 315 receives the request to record the allocated treatment from the user SDK 310. At event 9a, the SDK service 315 retrieves an experiment configuration for the experiment from the local cache. Alternatively, at event 9b, if the experiment configuration is not in the local cache, the SDK service 315 may retrieve the experiment configuration from a published database 320. At event 10, the experiment configuration is returned to the SDK service 315, either from the local cache or from the published database 320.

At event 11, the SDK service 315 verifies that the allocated treatment is valid for the retrieved experiment configuration. For example, the SDK service 315 may recalculate the treatment allocation performed at event 5 during the first stage, and compare the result to the treatment group name provided with the request from the user SDK 305. If there is a mismatch, the request data may be invalid and the process may be terminated. If there is a match, then at event 12 the SDK service 315 submits a request to record the allocated treatment to a log service 325, such as the log service 117 of FIG. 1. The log service 325 then records the allocated treatment.

In one embodiment, the events of the record allocated treatment 235 stage may not occur at all, for example, if the SDK service 315 never receives a request to record an allocated treatment from the user SDK 310.

Examples of Methods Performed by Application Experiment Systems

FIGS. 4 through 10 schematically illustrate logical flow diagrams for various embodiments of application experiment routines. In some implementations, the routines are performed by embodiments of the application experiment system 100 described with reference to FIG. 1 or by one of its components, such as the AES manager 125 or allocation module 115. For ease of explanation, the following describes the services as performed by the application experiment system 100. The example scenarios are intended to illustrate, but not to limit, various aspects of the application experiment system 100. In one embodiment, the routines can be dynamic, with some procedures omitted and others added. In one example, multiple instances of the routines may be occurring concurrently, for different application experiments.

Figure 4:
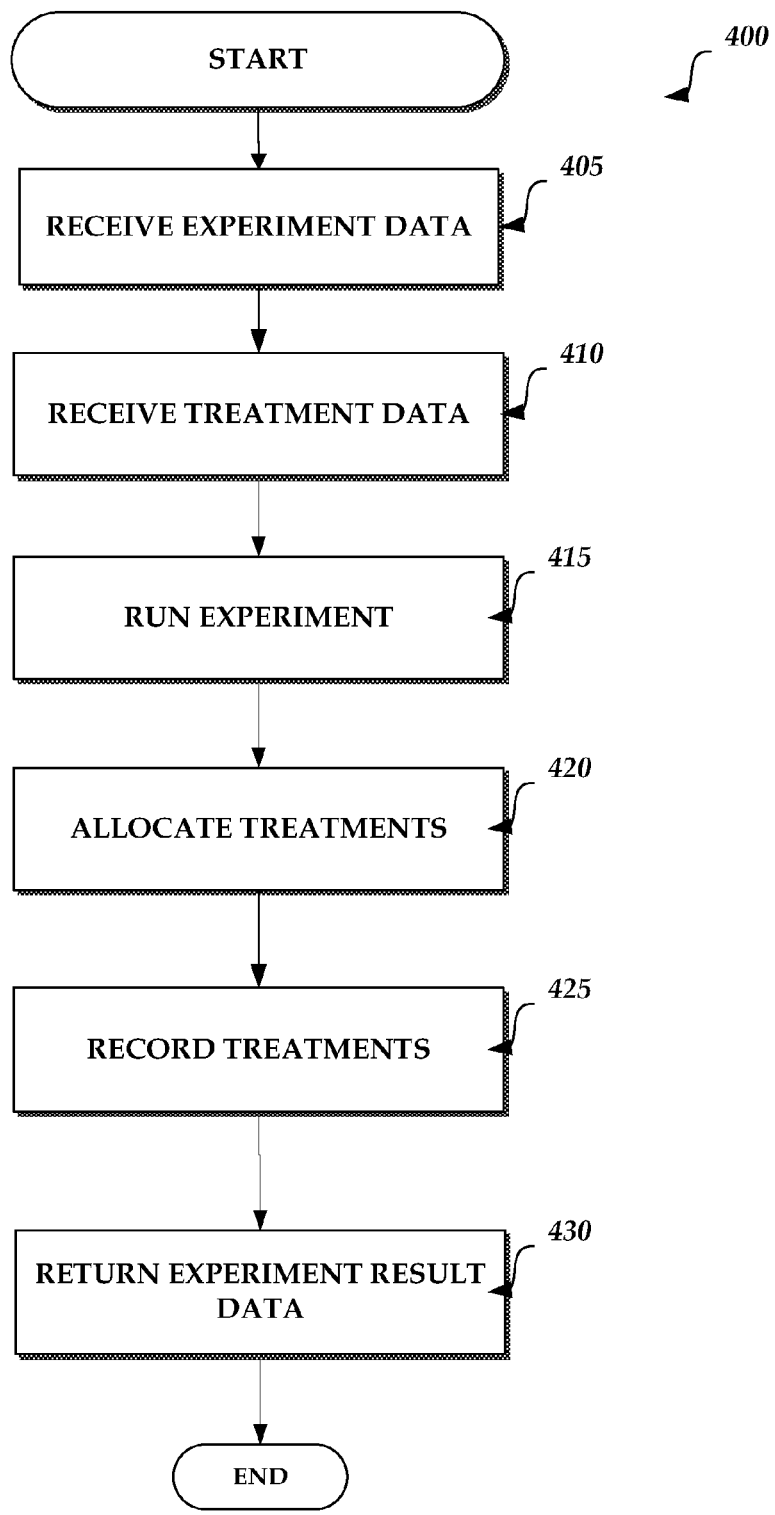
FIG. 4 schematically illustrates a logical flow diagram for an embodiment of an application experiment routine.

FIG. 4 schematically illustrates a logical flow diagram for an embodiment of an application experiment routine 400. Beginning at block 405, the application experiment system 100 receives and processes experiment data for an experiment. The receipt and processing of experiment data for the experiment is discussed in more detail with respect to FIG. 5 herein.

At block 410, the application experiment system 100 receives and processes treatment data for the experiment. The receipt and processing of treatment data for the experiment is discussed in more detail with respect to FIG. 6.

Continuing to block 415, the application experiment system 100 receives and processes a request to run the experiment. The running of the experiment is discussed in more detail with respect to FIG. 7.

At block 420, the application experiment system 100 receives and processes a request to allocate treatments for an experiment. The allocation of treatments is discussed in more detail with respect to FIG. 8.

Continuing to block 425, the application experiment system 100 receives and processes a request to record allocated treatments for an experiment. The recordation of allocated treatments is discussed in more detail with respect to FIG. 9.

At block 430, the application experiment system 100 returns experiment results data to users of the system. The return of experiment result data is discussed in more detail with respect to FIG. 10. The routine can then end.

Figure 5:
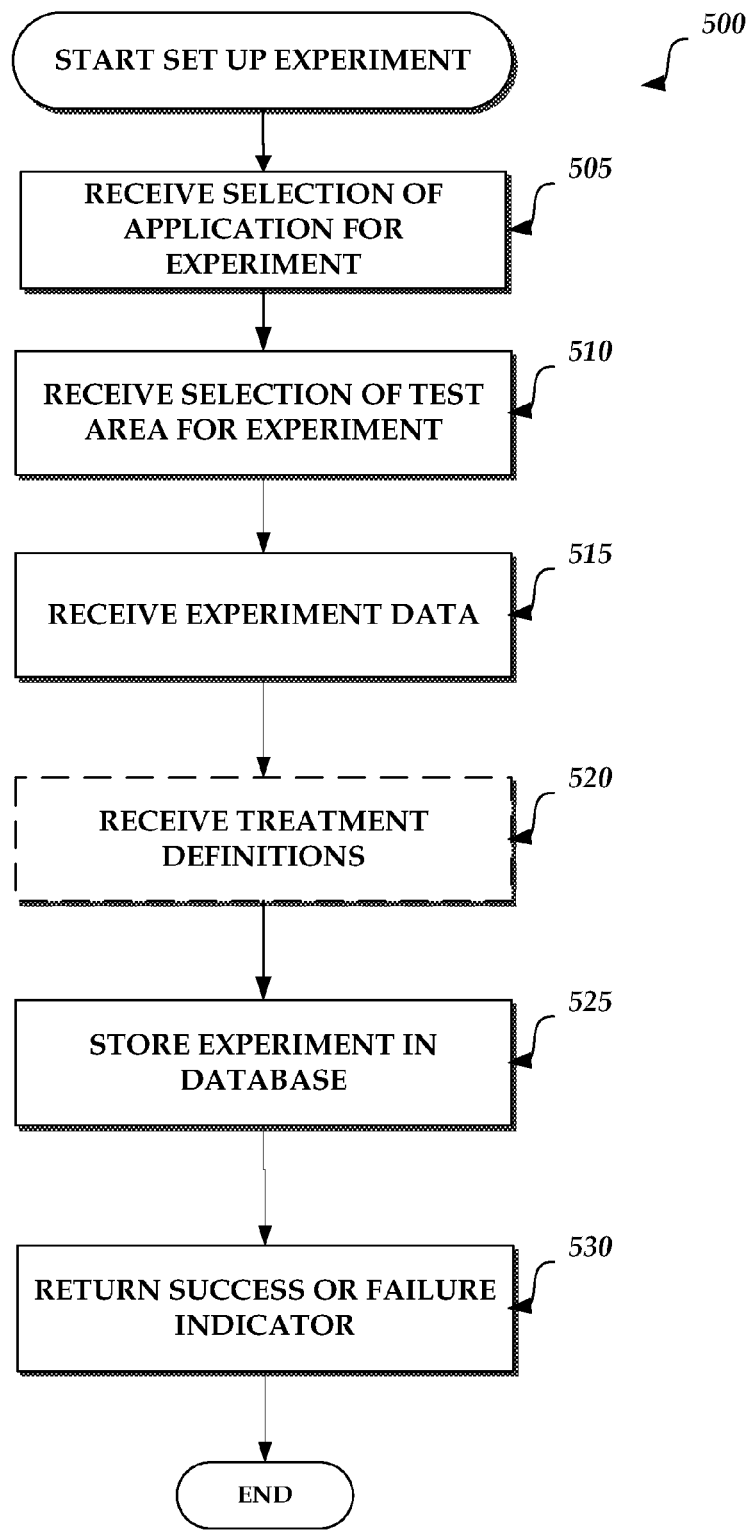
FIG. 5 schematically illustrates a logical flow diagram for an embodiment of a define experiment routine.

FIG. 5 schematically illustrates a logical flow diagram for an embodiment of a set up experiment routine 500. This diagram may also illustrate an embodiment of a routine to edit an already set up experiment, in which some or all of the same or similar procedures may occur.

Beginning at block 505, the application experiment system 100 receives a selection of an application for which an experiment is to be created. The selection of an application may be, for example, an application identifier. At block 510, the application experiment system 100 receives a selection of a test area within the application for the experiment. The selection of a test area may be, for example, a test area identifier.

At block 515, the application experiment system 100 receives experiment data. The experiment data may include, for example, data such as the application identifier, the test area identifier, an experiment name, a description, and an expiration date.

In one embodiment, at block 520, the application experiment system 100 receives definitions of one or more treatments for the experiment. The receipt and processing of treatment data for the experiment is discussed in more detail with respect to FIG. 6. In another embodiment, block 520 may be skipped and the application experiment system 100 may receive treatment definitions at another time.

Continuing at block 525, application experiment system 100 processes the experiment data and treatment definitions and stores the experiment in a database, such as one or more of the storage node(s) 120 of FIG. 1. At block 530, application experiment system 100 determines whether the storing of the experiment was successful and returns an indicator of the success or failure. The routine can then end.

Figure 6:
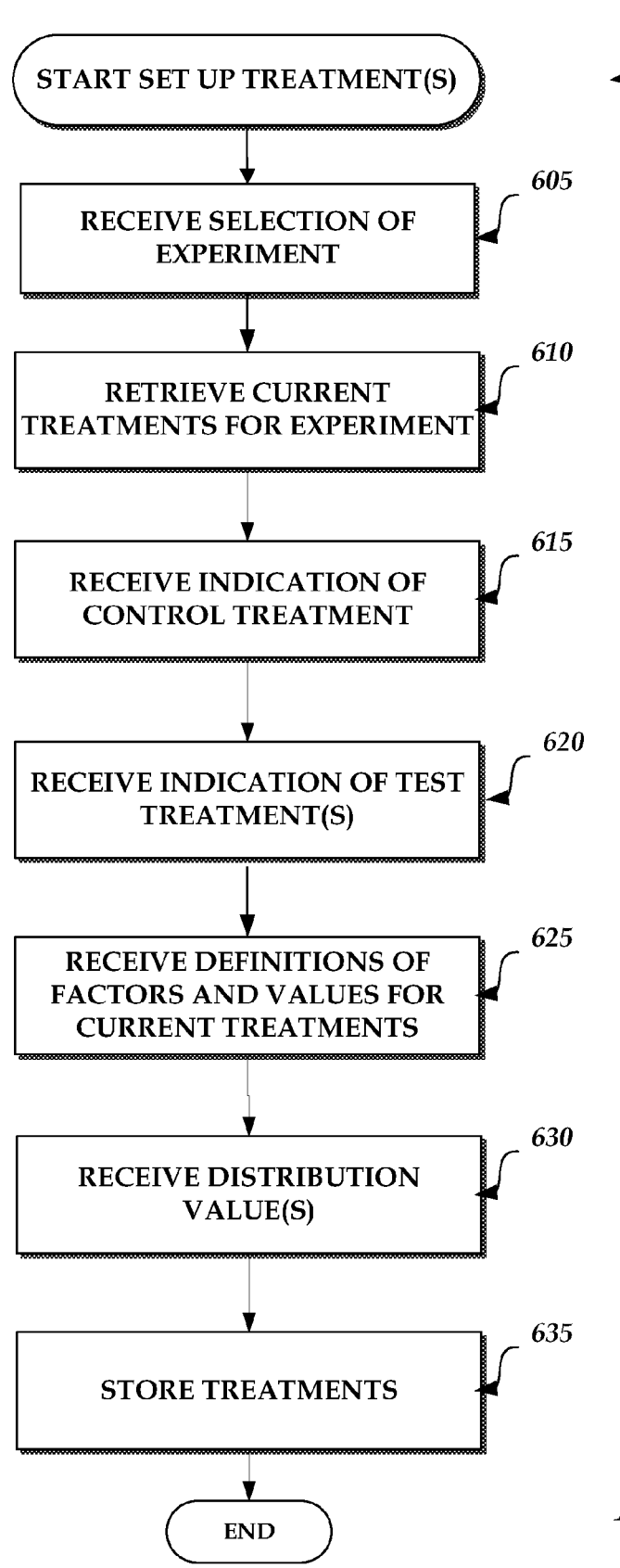
FIG. 6 schematically illustrates a logical flow diagram for an embodiment of a define treatment routine.

FIG. 6 schematically illustrates a logical flow diagram for an embodiment of a set up treatment routine 600. This diagram may also illustrate an embodiment of a routine to edit already set up treatments, in which some or all of the same or similar procedures may occur.

Beginning at block 605, the application experiment system 100 receives a selection of an experiment for which treatments are to be set up or edited. At block 610, the application experiment system 100 retrieves the current treatments for the experiment. At block 615, the application experiment system 100 receives an indication of one treatment as a control treatment. At block 620, the application experiment system 100 receives an indication of one or more treatments as test treatments.

Continuing at block 625, the application experiment system 100 receives definitions for one or more factors for the current treatments, and one or more values corresponding to the one or more factors. The factors are, for example, indications of which aspects of the application are to be modified during the experiment, and the values are indications of the modifications to be made.

At block 630, the application experiment system 100 receives distribution values for the current treatments. The distribution values indicate how treatments are to be allocated to users of the application. The distribution values may be, for example, percentages indicating the percent of users to receive a particular treatment. For example, one distribution value may be thirty percent for a first treatment, another distribution value may be thirty percent for a second treatment, and another distribution value may be forty percent for a third treatment.

At block 635, the application experiment system 100 stores the treatment data received. The routine can then end.

Figure 7:
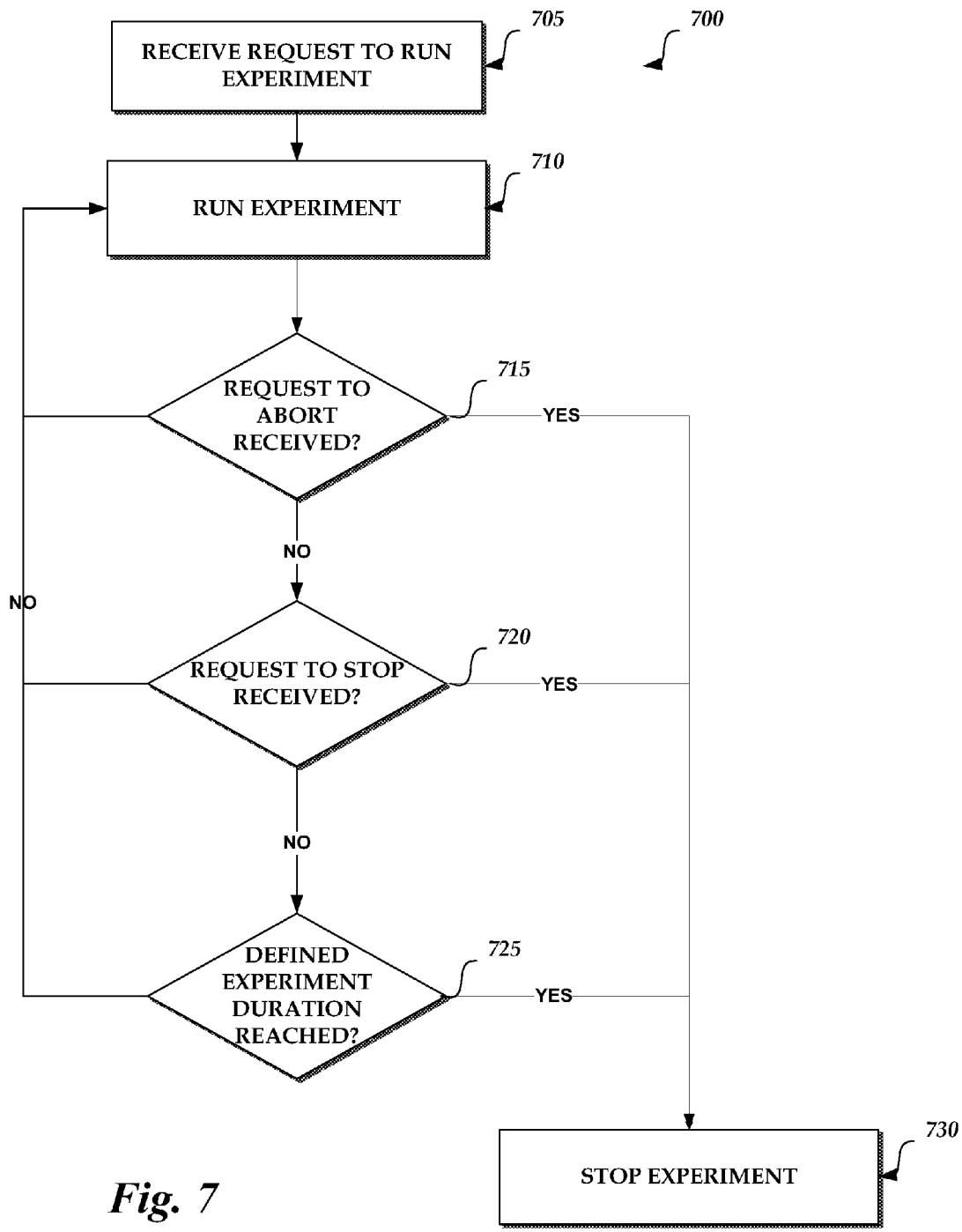
FIG. 7 schematically illustrates a logical flow diagram for an embodiment of a run experiment routine.

FIG. 7 schematically illustrates a logical flow diagram for an embodiment of a run experiment routine 700. Beginning at block 705, the application experiment system 100 receives a request to run an experiment. At block 710, application experiment system 100 processes the request and runs the experiment. For example, running the experiment may include updating the experiment status to "running" at an internal database, such as one of the storage node(s) 120 of FIG. 1, Blocks 715, 720, and 720 illustrate three ways in which the application experiment system 100 may end an experiment. Each of these procedures may occur optionally, sequentially, or in parallel.

At block 715, the application experiment system 100 determines whether a request to abort the experiment has been received. If yes, the application experiment system 100 proceeds to block 730.

At block 720, the application experiment system 100 determines whether a request to stop the experiment has been received. If yes, the application experiment system 100 proceeds to block 730. If no, the application experiment system 100 continues to run the experiment.

At block 725, the application experiment system 100 determines whether the provided experiment duration has been reached. If yes, the application experiment system 100 proceeds to block 730. If no, the application experiment system 100 continues to run the experiment.

At block 730, the application experiment system 100 stops the experiment. The routine can then end.

Figure 8:
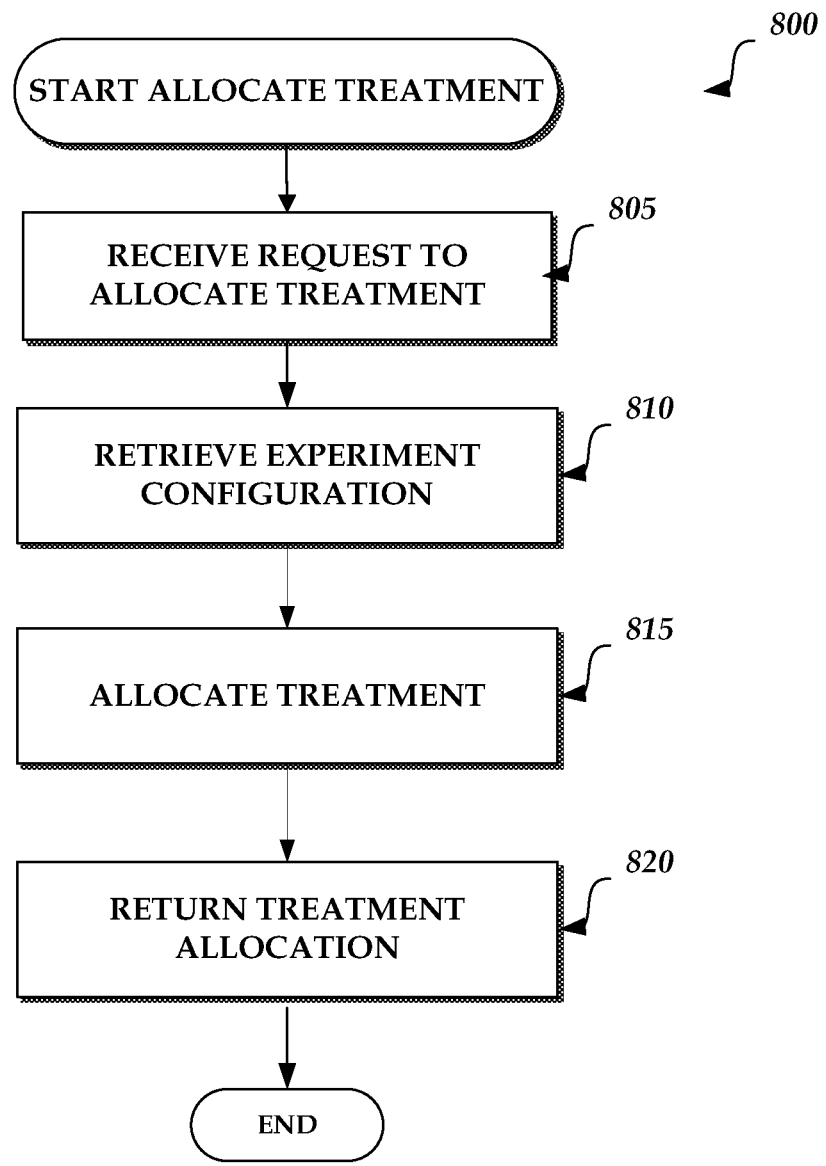
FIG. 8 schematically illustrates a logical flow diagram for an embodiment of an allocate treatment routine.

FIG. 8 schematically illustrates a logical flow diagram for an embodiment of an allocate treatment routine 800. Beginning at block 805, the application experiment system 100 receives a request to allocate a treatment for a test area. The request to allocate a treatment may include data used to locate and retrieve an experiment, for example an application identifier, a platform identifier, a test area identifier, and a unique identifier for the request. At block 810, the application experiment system 100 retrieves an experiment configuration for the experiment from a storage node, such as, for example, a local cache, or, if the experiment configuration is not in the local cache, a database of published experiments. The application experiment system 100 may locate and retrieve the experiment configuration using the application identifier, the platform identifier, and the test area identifier. The experiment configuration may include, for example, distribution values to indicate how treatments are to be allocated to users of the application. For example, one distribution value may indicate that thirty percent of users are to be allocated to a first treatment, thirty percent to a second treatment, and forty percent to a third treatment. The distribution values may vary depending upon the number of treatments provided for an experiment and may be previously set up, as further described with respect to FIG. 6 herein.

Continuing at block 815, once the experiment configuration is retrieved the application experiment system 100 uses the experiment configuration's distribution values to determine which treatment to allocate to the requesting user. The allocation may be determined in many various ways. As an illustration, and continuing the example above, the unique identifier may be used with a hashing algorithm to generate a hashed value in the range from 0 to 99, for example 29. Then, the distribution values provided for the experiment configuration may be treated as buckets for the hashed values, for example, 0-29, 30-59, and 60-99. Finally, treatments may be allocated corresponding to the buckets, such that unique identifiers with a corresponding hashed value in the range 0-29 may be allocated to the first treatment, unique identifiers with a corresponding hashed value in the range 30-59 may be allocated to the second treatment, and unique identifiers with a corresponding hashed value in the range 90-99 may be allocated to the third treatment. One additional benefit of the example provided herein may be that using a hashing algorithm in this way can ensure that the same unique identifier would generate the same hashed value, so that subsequent requests using the same unique identifier would receive the same treatment allocation. Thus, in some such embodiments, a user is allocated to the same treatment until the experiment configuration is changed (e.g., a distribution value is changed).

At block 820, the application experiment system 100 returns the determined treatment allocation to the users of the system. The treatment allocation may include, for example, a treatment group name. The routine can then end.

Figure 9:
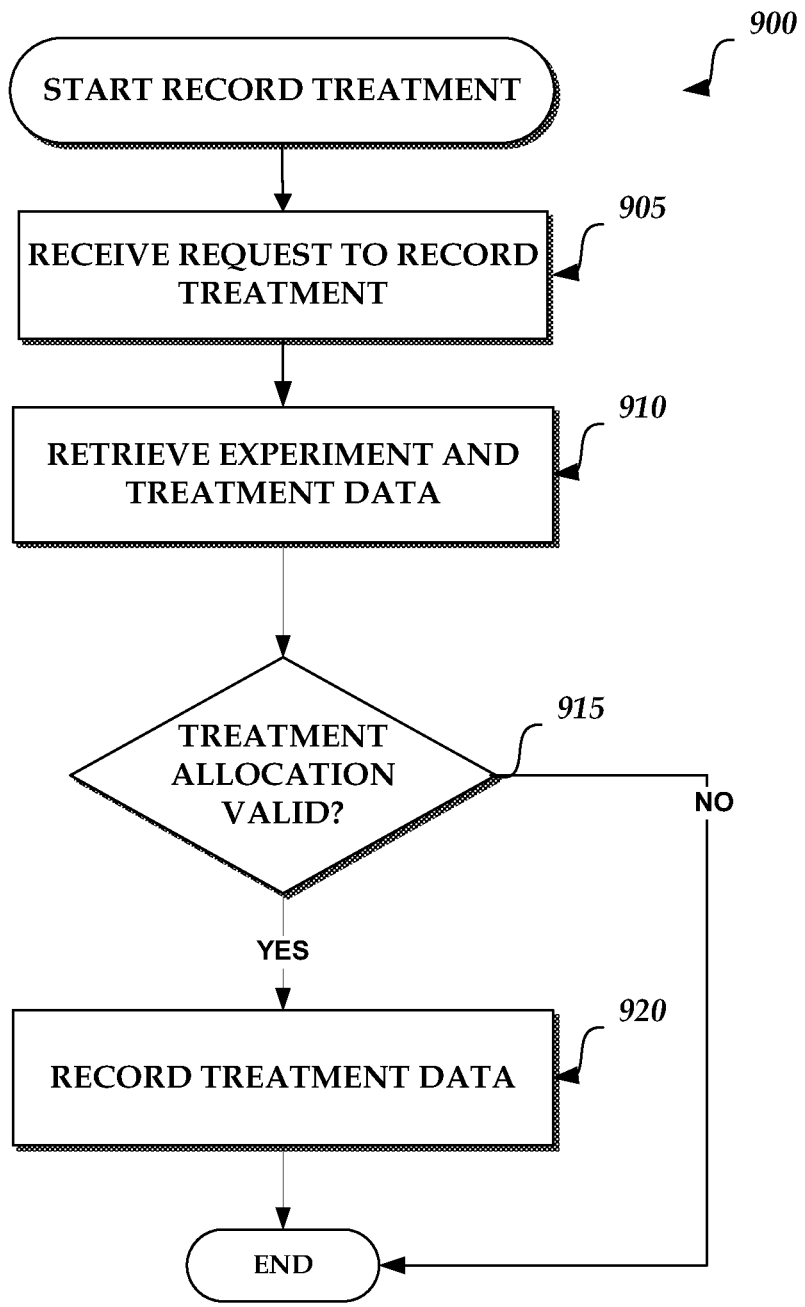
FIG. 9 schematically illustrates a logical flow diagram for an embodiment of a record allocated treatment routine.

FIG. 9 schematically illustrates a logical flow diagram for an embodiment of a record treatment routine 900. Beginning at block 905, the application experiment system 100 receives a request to record an allocated treatment for an experiment. The request to record an allocated treatment may include data used to identify the allocated treatment, for example the application identifier, the platform identifier, the test area identifier, a unique identifier for the request, and the treatment group name determined when the treatment was allocated as in FIG. 8 herein.

At block 910, the application experiment system 100 retrieves an experiment configuration and treatment definitions for the experiment, such as from one of the storage node(s) 120. At block 915, the application experiment system 100 determines whether the allocated treatment is valid for the retrieved experiment configuration and treatment definitions. For example, the application experiment system 100 may recalculate the treatment allocation performed as in FIG. 8, and compare the result to the treatment group name received at block 905. If the treatment is valid, application experiment system 100 proceeds to block 920. If the treatment is invalid, the routine may end.

At block 920, the application experiment system 100 records the allocated treatment data. The routine can then end.

Figure 10:
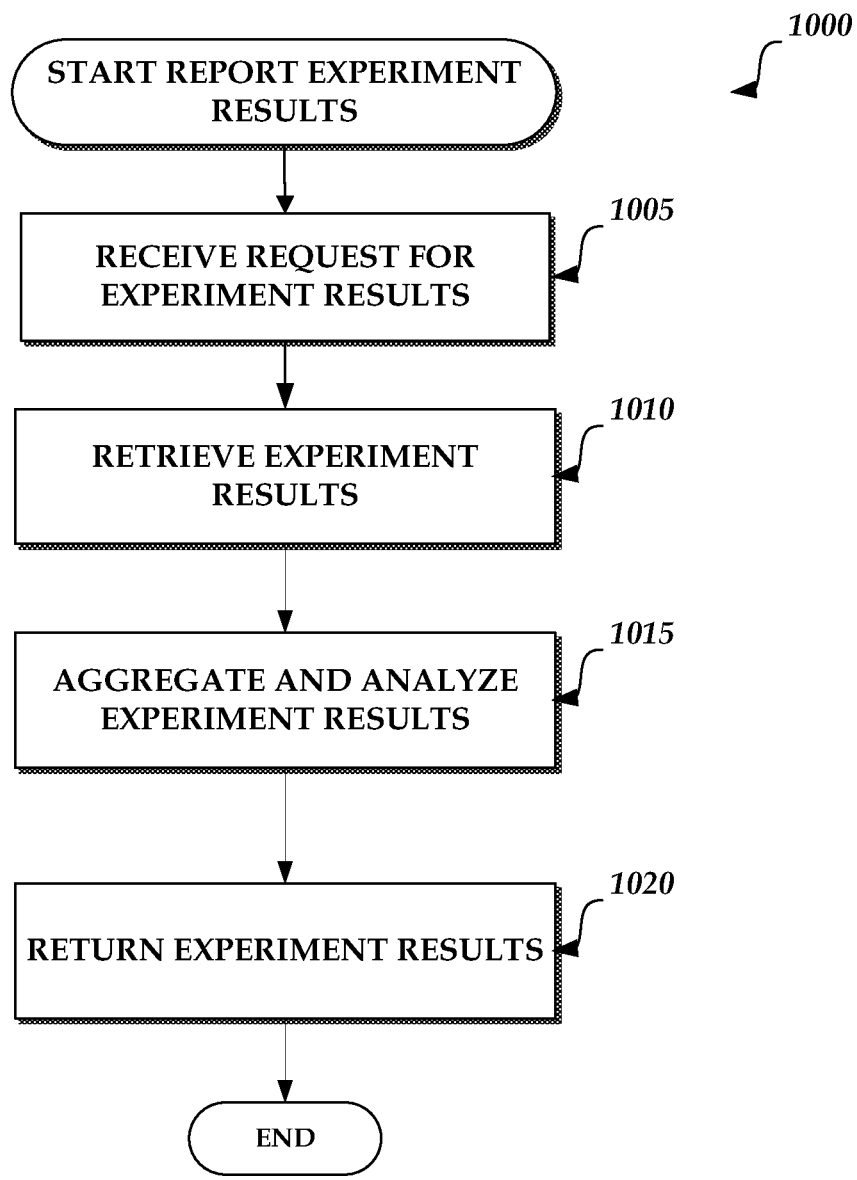
FIG. 10 schematically illustrates a logical flow diagram for an embodiment of a report experiment results routine.

FIG. 10 schematically illustrates a logical flow diagram for an embodiment of a report experiment results routine 1000. Beginning at block 1005, the application experiment system 100 receives a request for experiment result data. Experiment result data may include, for example, unique identifiers, experiment identifiers, treatment group names and whether the treatments are control or test treatments, data related to how many allocations of a treatment occurred during a particular period of time, data related to the frequency of allocations of a treatment, and other similar statistical measures.

At block 1010, the application experiment system 100 retrieves the experiment result data. At block 1015, the application experiment system 100 aggregates and analyzes the experiment results into a format useful for the requesting user. For example, a requesting user may be interested in knowing the number of times an experiment was run on an hourly or daily basis, and the distribution of treatments within the experiment.

At block 1020, the application experiment system 100 returns the experiment results to the requesting user. The routine can then end.

Examples of User Interfaces for Application Experiment Systems

Figure 11:
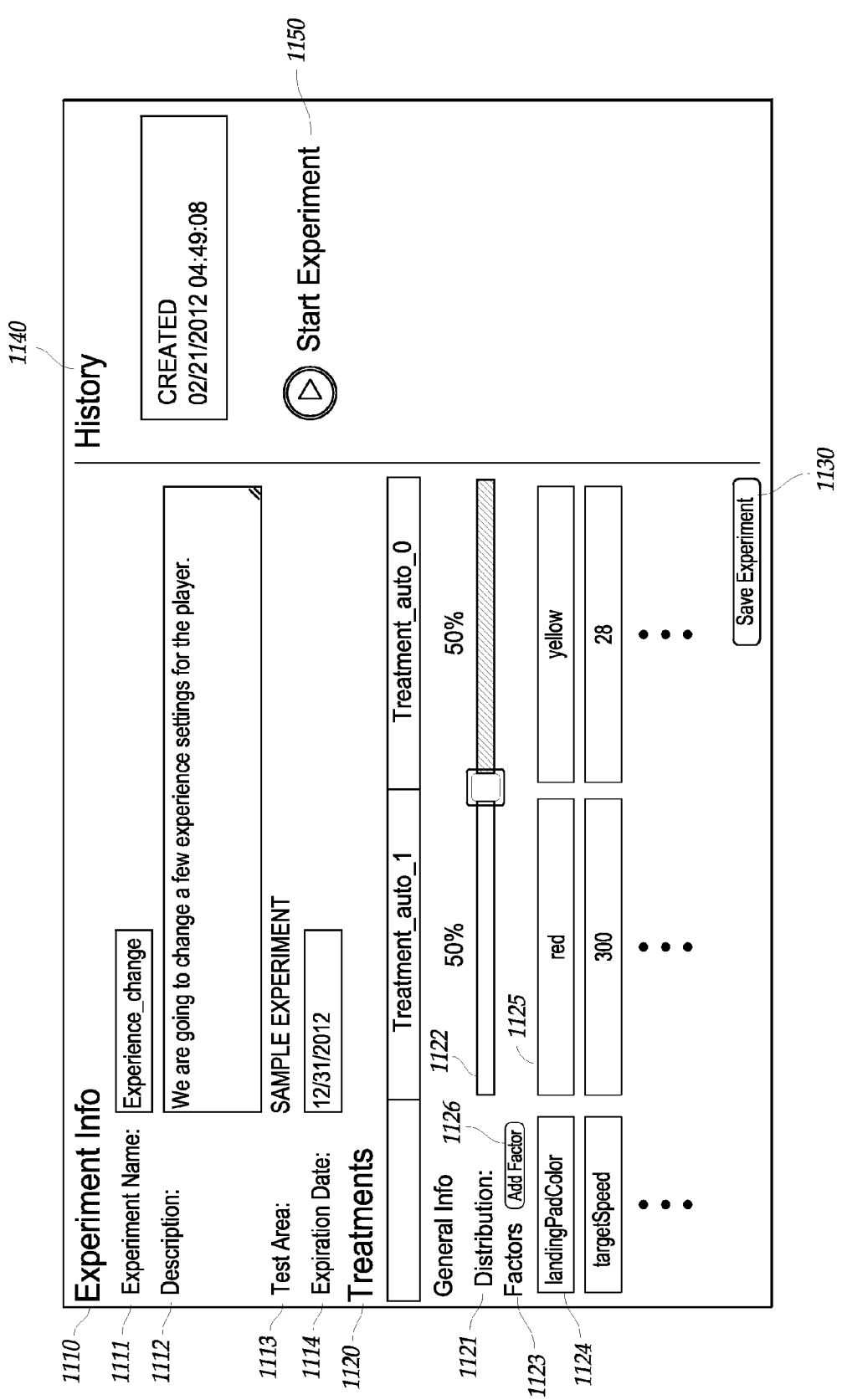
FIG. 11 is an example user interface which allows an application developer to define experiments and treatments.

FIG. 11 is an example user interface which allows an application developer to set up experiments and treatments. In this example, the application experiment system 100 presents a user interface 1100 to a developer at a developer computing system 105 which allows the developer to view and edit experiment information 1110, view and edit treatment information 1120, save the experiment 1130, view history information 1140, and start the experiment 1150. In one embodiment, the user interface 1100 may be provided to the developer through the developer interface 130 of the application experiment system 100. The user interface 1100 allows the developer to edit experiment information 1110, including experiment name 1111, experiment description 1112, and an expiration date 1114. The user interface 1100 also allows the developer to view the test area 1113 for the experiment, and may optionally allow the developer to edit the test area in another embodiment.

The user interface 1100 also allows the developer to view and edit treatment information 1120 for the experiment, including distribution values 1121 for the one or more treatments. The distribution values may be edited, for example, by adjusting a slider bar 1122 to visually indicate the distribution. In other embodiments the distribution values may be edited by, for example, manually entering numbers into a text field.

The user interface 1100 also allows the developer to view and edit factor information 1123 for the treatments. Factor information includes, for example, a factor name 1124, and a factor value 1125 for each of the treatments. The user interface 1100 also allows the developer to add additional factors 1126. In another embodiment, the user interface 1100 also allows the developer to delete factors.

When the developer finishes entering the experiment information and treatment information, the developer may click on the "Save Experiment" button 1130, and the information may be gathered and sent to the application experiment system 100, and in particular the AES manager 125 of FIG. 1, which processes and stores the information, for example, in storage node(s) 120.

The user interface 1100 also allows the developer to start the experiment 1150. When this option is selected, the application experiment system 100 receives the request to start the experiment and performs the routine as described, for example, with respect to FIG. 7.

Once the developer has set up an experiment, to enable the experiment on a user computing system running the application, the developer need only add a few lines of source code to the application, in accordance with a Software Developer Kit (SDK) provided by the application experiment system 100. An executable version of the modified source code may then be deployed to the user computing system, and the user computing system later allocated to a test treatment may experience the provided changes or features when it executes (or request execution) of the executable version. An example of source code modifications that may enable the experiment in the application is provided below:

```
// Create an instance of the TreatmentManager and provide the
// application context
TreatmentManager tm = new TreatmentManager(this.getContext( ));
// Set the application id. This may be a string value provided to you
// from the developer portal
tm.setApplicationId(APPLICATION_ID);
// Set a unique id. This is used to determine treatment
// distribution.
tm.setUniqueId(UNIQUE_ID);
// Retrieve a treatment from the server for a specific test area
// and record usage for reporting. Optionally getting and
// triggering of a treatment can be separated in to two calls.
Treatment gameTreatment =
tm.getTreatmentAndTrigger("SAMPLE_EXPERIMENT");
// Get a factor from the retrieved treatment using the name of the
// factor as a key.
String landingPadColor = gameTreatment.optFactor("landingPadColor",
String.class, DEFAULT_FACTOR_VALUE);
// Optionally, get the treatment group for logging
String group = gameTreatment.getTreatmentGroup( );
```

In the example source code above, the developer inserts code which sets an application identifier and a unique identifier for the treatment, and then gets, or requests, a treatment allocation from the application experiment system 100. Optionally as shown above, the developer can insert code which gets a treatment and records the treatment allocation in one operation. Once the treatment is provided by the application experiment system, the code is configured to get test factors and test values from the treatment configuration. The developer can then insert additional source code to apply the test values to test factors throughout the application in accordance with the experiment.

For example, in the code above, the application may be a game in which a user or player attempts to land a rocket ship on a landing pad. The application can be configured to run an experiment designed to test the landing pad color. In this example, what color to make the landing pad is a test factor, and the actual color applied is the test value. Thus, a control treatment could set up the landing pad color as red, while a test treatment could set up the landing pad color as green. Other factors to be tested in such an application could include the speed of the rocket, the size of the landing pad, what is displayed as a background image, and other features. The application experiment system 100, using the experiment configuration provided by the developer via, for example, the user interface of FIG. 11, determines which users should experience control or test treatments, provides the appropriate test values to users running the application, and collects and analyzes data about these treatment experiences for the developer.

Figure 12:
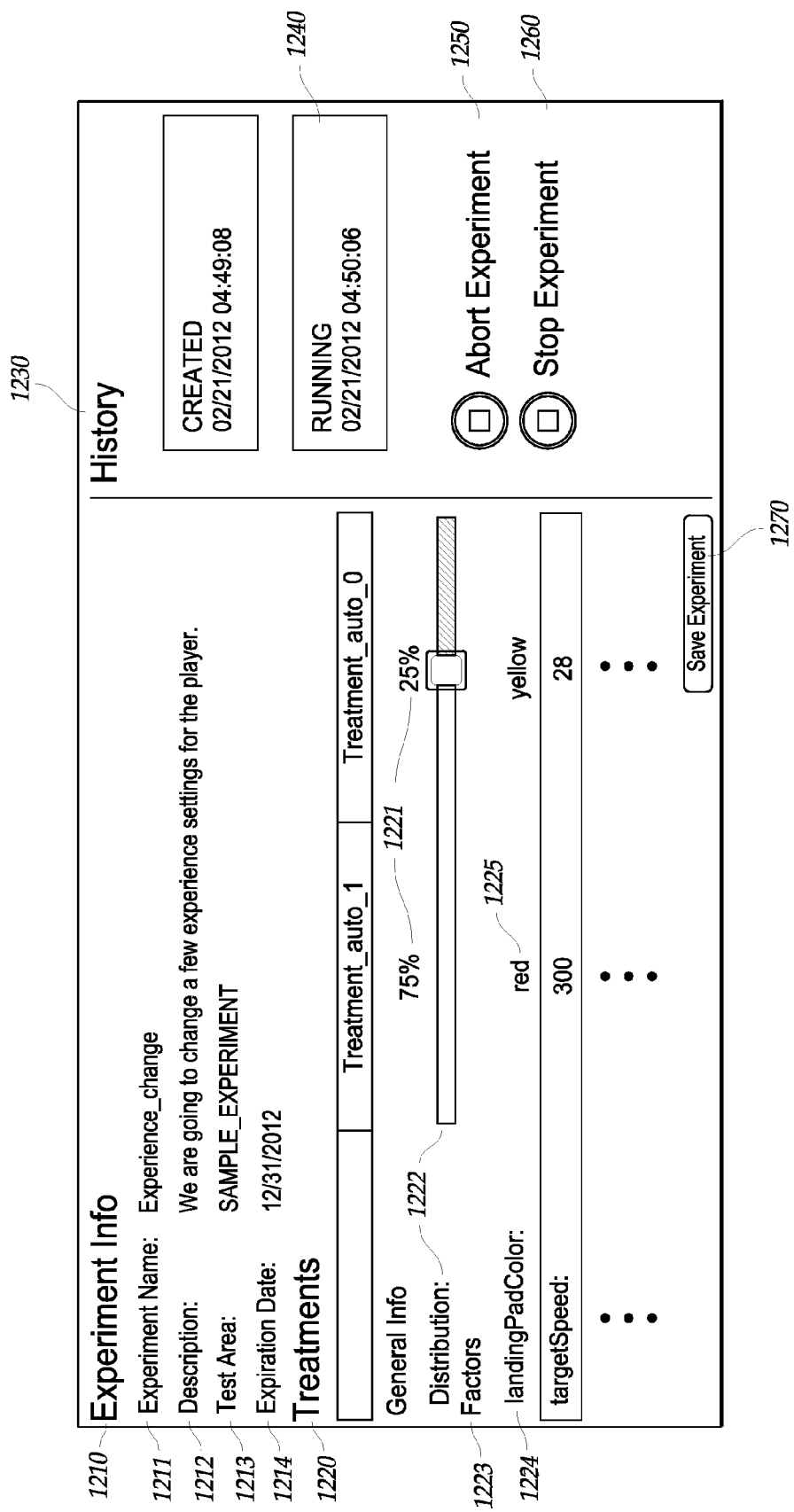
FIG. 12 is an example user interface which allows an application developer to manage a running experiment.

FIG. 12 is an example user interface which allows an application developer to manage a running experiment. In this example, the application experiment system 100 presents a user interface 1200 to a developer at a developer computing system 105 which allows the developer to view experiment information 1210, view treatment information 1220, view history 1230 and running status information 1240, abort the experiment 1250, and stop the experiment 1260. In one embodiment, the user interface 1100 may be provided to the developer through the developer interface 130 of the application experiment system 100.

The user interface 1200 allows the developer to view experiment information 1210, including experiment name 1211, experiment description 1212, test area name 1213, and expiration date 1214. The user interface 1200 also allows the developer to view treatment information 1220 for the experiment, including distribution values 1221 for the one or more treatments. The distribution values may be edited, for example, by adjusting a slider bar 1222 to visually indicate the distribution. In other embodiments the distribution values 1221 may be edited by, for example, manually entering numbers into a text field. When the developer finishes editing the distribution information the developer may click on the "Save Experiment" button 1270, and the information may be gathered and sent to the application experiment system 100, and in particular the AES manager 125, which processes and stores the information, for example, in storage node(s) 120.

The user interface 1200 also allows the developer to view factor information 1223 for the treatments. Factor information includes, for example, a factor name 1224, and a factor value 1225 for each of the treatments.

The user interface 1200 allows the developer to abort 1250 or stop the experiment 1260. When either of these options is selected, the application experiment system 100 receives the request to abort or stop the experiment and performs the routine as described, for example, in FIG. 7 herein.

As will be apparent, many variations on the application experiment system 100 described above are possible. For example, in one embodiment, the allocation of treatments to users may be adjusted while an experiment is running if the developer adjusts the distribution setting, and thus some users who were originally allocated a control treatment may instead be allocated to a test treatment, or vice versa. In another embodiment, an experiment may be run multiple times in a series with different distribution settings and/or treatment definitions. Thus for example, the developer may run a first experiment, determine that one treatment provides a more positive user experience compared to a second treatment, and then run a second experiment to test the first treatment against a third treatment, and so on as many times as desired. The experiment results data may also be aggregated and analyzed across the series of experiments, not just on a per-experiment basis. In another embodiment, experiment results data related to game applications may include data related to in-game purchases made by users. For example, treatment factors may be provided which relate to in-game purchase options, and the associated experiment data may be analyzed and reported to developers in order to evaluate the effectiveness of in-game purchase options and features.

In another embodiment, the application experiment system 100 may be configured to automatically adjust the distribution settings to increase the allocation of users to treatments which are determined to provide a more positive user experience or to be more effective to achieve a desired result. For example, an experiment may be set up with treatments to measure and evaluate a number of "add to shopping cart" clicks as the test factors. The application experiment system 100 may be configured to log the treatment data, analyze the experiment results, determine that one treatment results in more "add to shopping cart" clicks than other treatments, and then automatically change the distribution setting to increase the number of allocated users receiving the first, more effective treatment. In some embodiments, the distribution settings may be modified to allocate users to a particular treatment, either on a temporary or permanent basis. Thus for example, in response to a test treatment resulting in a positive user experience, a developer may decide to allocate some or all users to a test treatment with the positive user experience. As another example, in response to a test treatment resulting in a negative user experience, the developer may decide to abort the experiment and allocate all users to a control treatment with the "default" treatment test values (e.g., prior to the changes that led to the negative user experience).

In one embodiment, the application experiment system 100 may provide interactive feedback to the developer including, for example, indications of when and/or for how long experiments may run and provide a real-time or near real-time status of the experiments. In some embodiments, the application experiment system 100 can generate a report detailing or summarizing the results of the experiments and communicate the report to the developer via electronic mail or text or provide access to the report, experiment status, or interactive feedback via Web services.

Notifications (e.g., e-mails, text messages, etc.) may also be sent to developers using the application experiment system 100 when various events occur. The events can include, for example, when an experiment begins running, ends, or is stopped or aborted, when treatments are allocated, or when treatments are recorded. Notifications can also be provided for other events.

As described above, the application experiment system 100 can be implemented with one or more physical servers or computing machines, such as several computing machines interconnected via a network. Thus, each of the components depicted in the application experiment system 100 can include hardware and/or software for performing various features. In one embodiment, the application experiment system 100 is a web site or collection of web sites.

Like the application experiment system 100, developer computing systems 105 can be implemented in hardware and can include any type of computing device. The developer systems 105 can, but need not be, operated by entities who are different from one another and who are different from a user of the application experiment system 100. For example, the application experiment system 100 may be a web service made available to 3rd party developers by a web services provider for a fee or for free.

The application experiment system 100 can include one or more servers for receiving and responding to network requests from the developer computing devices 105. The one or more servers can include web servers, application servers, database servers, combinations of the same, or the like. In some embodiments, the network 110 is a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

The processing of the various components of the application experiment system 100 can be distributed across multiple machines, networks, and other computing resources. The various components of the application experiment system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the application experiment system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of programmatic interactions (additionally or alternatively) between the application experiment system 100 and the developer computing systems 105 and/or user computing systems 107 are possible in addition to those described above. For example, an application experiment system 100 submission or command be received directly from a user (e.g., via an interactive console or other graphical user interface (GUI) provided by the application experiment system 100) or from an executing program on a developer computing device 105. In some embodiments, users may interact with the application experiment system 100 using other types of interfaces and in other ways. For example, the application experiment system 100 may provide a web services interface (e.g., a web page or set of web pages) that allows a user to submit a request using a web browser. Other types of interfaces may also be used.

In some embodiments, a server computing system that has components including a central processing unit (CPU), input/output (I/O) components, storage, and memory may be used to execute the application experiment system 100 or specific components of the application experiment system 100. The executable code modules of the application experiment system 100 can be stored in the memory of the server and/or on other types of non-transitory computer-readable storage media. In some embodiments, the application experiment system 100 may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for performing an experiment on a software application, the method comprising:
    under control of a computing system comprising computing hardware including one or more processors:
        during execution of an instance of a software application on the computing system, receiving, from a remote system, an allocation of a treatment configuration for an experiment for the software application, wherein the treatment configuration includes:
            at least one test factor;
            at least one test value corresponding to the at least one test factor; and
            a treatment distribution parameter indicating how the treatment configuration is to be distributed to one or more computing systems executing instances of the software application, wherein the treatment distribution parameter specifies a percent value indicating a percentage of running instances of the software application that should receive the treatment configuration, and wherein the treatment configuration is allocated based on the treatment distribution parameter;
        receiving the at least one test value corresponding to the at least one test factor associated with the treatment configuration; and
        modifying the instance of the software application to reference the at least one test value during execution.

2. The method of claim 1, wherein the treatment configuration allocated to the computing system is different from a previous treatment configuration that was allocated to the computing system during a previous allocation.

3. The method of claim 1, wherein the at least one test value associated with the at least one test factor is updated during execution of the instance of the software application.

4. The method of claim 1, further comprising:
    receiving, from the remote system, an allocation of a different treatment configuration for the experiment for the software application; and
    receiving at least one test value corresponding to at least one test factor associated with the different treatment configuration.

5. The method of claim 1, further comprising:
    logging treatment data associated with the at least one test value and the modified instance of the software application; and
    transmitting the treatment data to the remote system.

6. A system comprising:
    a non-transitory electronic data store configured to at least store an experiment configuration specifying one or more treatment configurations for a software testing experiment for a software application,
        wherein individual ones of the treatment configurations specify at least one test factor, at least one corresponding test value, and a treatment distribution parameter indicating how the individual treatment configuration is to be distributed to one or more remote computing devices executing instances of the software application, wherein the treatment distribution parameter specifies a percent value indicating a percentage of running instances of the software application that should receive the individual treatment configuration; and
    a computing system comprising one or more hardware computing devices, said computing system in communication with the electronic data store and configured to at least:
        receive, from a remote computing device executing an instance of the software application, a request to allocate a treatment configuration for the software testing experiment;
        retrieve the experiment configuration from the electronic data store;
        allocate, based at least in part on the experiment configuration and associated treatment distribution parameters, a selected treatment configuration to the remote computing device; and
        provide, to the remote computing device, the at least one test value associated with the selected treatment configuration, wherein the instance of the software application is modified to reference the at least one test value during execution of the software application.

7. The system of claim 6, wherein the selected treatment configuration allocated to the remote computing device is different from a previous treatment configuration that was allocated to the remote computing device in response to a previous request to allocate.

8. The system of claim 6, wherein the computing system is further configured to receive, from the remote computing device, treatment data associated with the selected treatment configuration and the modified instance of the software application.

9. The system of claim 6, wherein to allocate a selected treatment configuration to the remote computing device, the computing system is further configured to:
    determine a unique identifier associated with the remote computing device;
    generate, via a hashing algorithm, a hashed value based on the unique identifier, wherein the hashed value is a numeric value in the range of 0 to 99; and allocate the selected treatment configuration based on a comparison of the associated treatment distribution parameters for the experiment configuration to the hashed value.

10. The system of claim 6, wherein the computing system is further configured to:
receive an updated treatment distribution parameter for the selected treatment configuration;
allocate, to the remote computing device, a different treatment configuration associated with the experiment configuration, based at least in part on the updated treatment distribution parameter; and
provide, to the remote computing device, the at least one test value associated with the different treatment configuration.

11. The system of claim 10, wherein the updated treatment distribution parameter is received via a user interface configured to receive the experiment configuration for the software testing experiment.

12. Non-transitory computer-readable storage comprising computer-executable instructions stored thereon that, when executed by one or more hardware processors, are configured to cause the one or more hardware processors to perform operations comprising:
receiving, from a remote computing device executing an instance of a software application, a request to allocate a treatment configuration for a software testing experiment;
accessing, by a computing system comprising one or more hardware computing devices, an experiment configuration from an electronic data store comprising hardware, wherein the experiment configuration specifies one or more treatment configurations, and wherein individual ones of the treatment configurations specify at least one test factor, at least one corresponding test value, and a treatment distribution parameter indicating how the individual treatment configuration is to be distributed to one or more remote computing devices executing instances of the software application, wherein the treatment distribution parameter specifies a percent value indicating a percentage of running instances of the software application that should receive the individual treatment configuration;
allocating, based at least in part on the experiment configuration and associated treatment distribution parameters, a selected treatment configuration to the remote computing device; and
providing, to the remote computing device, the at least one test value associated with the selected treatment configuration,
wherein the instance of the software application is modified to reference the at least one test value during execution of the software application.

13. The non-transitory computer-readable storage of claim 12, wherein allocating, based at least in part on the experiment configuration and associated treatment distribution parameters, a selected treatment configuration to the remote computing device further comprises:
determining a unique identifier associated with the remote computing device;
generating, via a hashing algorithm, a hashed value based on the unique identifier, wherein the hashed value is a numeric value in the range of 0 to 99; and
allocating the selected treatment configuration based on a comparison of the associated treatment distribution parameters for the experiment configuration to the hashed value.

14. The non-transitory computer-readable storage of claim 12, wherein the operations further comprise:
receiving an updated treatment distribution parameter for the selected treatment configuration;
allocating, to the remote computing device, a different treatment configuration associated with the experiment configuration, based at least in part on the updated treatment distribution parameter; and
providing, to the remote computing device, the at least one test value associated with the different treatment configuration.

15. The non-transitory computer-readable storage of claim 14, wherein the updated treatment distribution parameter is received via a user interface configured to receive the experiment configuration for the software testing experiment.

16. The non-transitory computer-readable storage of claim 12, wherein the operations further comprise receiving, from the remote computing device, treatment data associated with the selected treatment configuration and the modified instance of the software application.

17. The non-transitory computer-readable storage of claim 12, wherein the selected treatment configuration allocated to the remote computing device is different from a previous treatment configuration that was allocated to the remote computing device in response to a previous request to allocate.

* * * * *